(12) United States Patent
Wang et al.

(10) Patent No.: US 11,333,571 B2
(45) Date of Patent: May 17, 2022

(54) DYNAMIC SEAL TEST DEVICE FOR CRYOGENIC FLUID MEDIUM

(71) Applicant: DALIAN UNIVERSITY OF TECHNOLOGY, Dalian (CN)

(72) Inventors: Yongqing Wang, Liaoning (CN); Lingsheng Han, Liaoning (CN); Kuo Liu, Liaoning (CN); Fanze Kong, Liaoning (CN); Haibo Liu, Liaoning (CN); Yongquan Gan, Liaoning (CN); Minghua Dai, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 15/734,881

(22) PCT Filed: Sep. 16, 2019

(86) PCT No.: PCT/CN2019/105933
§ 371 (c)(1),
(2) Date: Dec. 3, 2020

(87) PCT Pub. No.: WO2021/027002
PCT Pub. Date: Feb. 18, 2021

(65) Prior Publication Data
US 2021/0190627 A1 Jun. 24, 2021

(30) Foreign Application Priority Data
Aug. 12, 2019 (CN) .......................... 201910737681.2

(51) Int. Cl.
*G01M 3/28* (2006.01)
*G01M 3/26* (2006.01)
(Continued)

(52) U.S. Cl.
CPC ........... *G01M 3/26* (2013.01); *F16J 15/0887* (2013.01); *G01M 3/025* (2013.01); *G01M 3/36* (2013.01)

(58) Field of Classification Search
CPC ........... G01M 3/26; G01M 3/025; G01M 3/36
See application file for complete search history.

(56) References Cited

U.S. PATENT DOCUMENTS

| | | | | |
|---|---|---|---|---|
| 2004/0048131 | A1* | 3/2004 | Canepa | F04B 39/04 429/492 |
| 2014/0284183 | A1* | 9/2014 | Wolters | F16H 1/32 198/788 |
| 2018/0207757 | A1* | 7/2018 | Eralti | G01D 3/08 |

FOREIGN PATENT DOCUMENTS

| | | |
|---|---|---|
| CN | 1825083 A | 8/2006 |
| CN | 105277323 A | 1/2016 |

(Continued)

OTHER PUBLICATIONS

Zhang, Guoyuan and Chen, Guozhong and Zhao, Weigang and Yan, Xiutian and Zhang, Yi (2017) An experimental test on a cryogenic high-speed hydrodynamic non-contact mechanical seal. Tribology letters, 65 (3). 80. ISSN 1023-8883 (Year: 2017).*

*Primary Examiner* — Alexander A Mercado
(74) *Attorney, Agent, or Firm* — Muncy, Geissler, Olds & Lowe, P C.

(57) ABSTRACT

The invention provides a dynamic seal test device for cryogenic fluid medium. The dynamic seal test device includes stator unit, rotor unit, slipway, servo motor unit and sensors. The tested seal is installed inside the stator, and the thermal insulation stator and vacuum rotor together form a dynamic seal test structure. The seals and shaft sleeves can be flexibly replaced, which is beneficial to study the influence of different seal types, structure, and seal land configurations on the sealing performance. The servo motor (Continued)

provides power for the rotor and controls the rotation speed. The device greatly improves the thermal insulation capacity to avoid the gasification for the cryogenic fluid medium induced by the heat transfer from environment so that ensuring the stability of the test device.

1 Claim, 2 Drawing Sheets

(51) Int. Cl.
*F16J 15/08* (2006.01)
*G01M 3/02* (2006.01)
*G01M 3/36* (2006.01)

(56) References Cited

FOREIGN PATENT DOCUMENTS

| | | | | |
|---|---|---|---|---|
| CN | 105628309 A | | 6/2016 | |
| CN | 106932157 A | * | 7/2017 | |
| CN | 108332959 A | | 7/2018 | |
| CN | 108708802 A | | 10/2018 | |
| CN | 108775988 A | | 11/2018 | |
| CN | 109211771 A | * | 1/2019 | |
| DE | 102012100010 A1 | * | 7/2012 | ............ H02K 11/20 |
| DE | 102013225235 A1 | | 6/2015 | |
| KR | 20160031089 A | * | 3/2016 | |
| KR | 20170040478 A | * | 4/2017 | |

* cited by examiner

DYNAMIC SEAL TEST DEVICE FOR CRYOGENIC FLUID MEDIUM

TECHNICAL FIELD

The invention belongs to the technical field of sealing test, specifically relates to a dynamic seal test device for cryogenic fluid medium.

BACKGROUND

In recent years, liquid hydrogen, liquid oxygen, liquid nitrogen, and other cryogenic fluid mediums are widely used as the fuel for aerospace engines, the coolant for cryogenic machining and low-temperature minimally invasive surgery, etc.

The cryogenic dynamic seal technology is concerned in the turbopump of liquid rocket engines, the spindle with internal cooling function of liquid nitrogen in cryogenic machine tools, the toolholder with liquid nitrogen transmission function and other key components.

Reliable sealing plays the key role for ensuring a safe, high-efficiency and steady operation for the above components. Reports show that the failure caused by sealing problem accounts for about 12.5% of the total failures in rocket engines, and the leakage leads to an increase of fuel consumption by 3%-10%. Furthermore, failures of assembly, lubrication and rotation inside the spindle and toolholder in the cryogenic machine tool are induced by the liquid nitrogen leakage, also, the stability of liquid nitrogen transport is seriously destroyed by the leakage which results in a discontinuous and unsteady jets from the tool nose. Therefore, it is so crucial for designing a reasonable seal structure to obtain a well sealing performance. However, the ultra-low temperature characteristics of the cryogenic fluid medium easily lead to the structure deformation, accuracy loss, and even leakage problem. Also, cryogenic fluid medium is easy of vaporization so that the leakage rate is hardly measured using the common flowmeter. Thereby higher requirements are proposed for the thermal insulation performance, structure stability, low temperature resistance of sensors, information acquisition and accuracy assurance of the dynamic seal test device for cryogenic fluid medium.

At present, a variety of dynamic seal test devices have been developed for cryogenic mediums. In 2018, Guoyuan Zhang introduced a mechanical seal test device in the paper "Optimization and test of parameters of the cryogenic hydrodynamic mechanical seal" which is published in "Journal of Aeronautical Power". In this device, the leakage rate and friction between the seal faces are measured to learn the contact status and sealing performance of the sealing surface while liquid nitrogen flows through the seal. But variation trends of the pressure and temperature of the fluid is not obtained inside the seal. In 2018, as described in the patent "A low-temperature and high-speed face seal test device for the turbopump of liquid rocket engines" (Application No.: CN201810352843.6) from Beijing Aerospace Propulsion Institute, the real working environment of the turbopump is simulated, also, the sufficient working accuracy and low-temperature stability are ensured in the device. Meanwhile, the pressure, temperature and leakage rate of liquid nitrogen, the rotor speed and system power are measured. Whereas the disadvantage of this method is that the thermal insulation inside the device is not considered, and the detailed measurement method of the leakage rate is not stated.

The above studies fail to fully reflect the influence of seal structure on the sealing performance of cryogenic fluid mediums and have no thermal insulation treatment for the area in contact with the fluid in the device. Also, there is not a clear statement for the leakage measurement method aiming at a little leakage or evaporation occurring for the cryogenic fluid mediums. In addition, there are some limitations in the investigation of seal types.

SUMMARY

The present invention aims at improving the current situation, where it is difficult to realize the multi-layer and high-precision dynamic seal testing of cryogenic mediums by using present test devices, proposing a dynamic seal test device for cryogenic fluid medium. A vacuum structure and the insulated material are respectively applied for the rotor and seal inside the dynamic seal test device to prevent the cryogenic fluid medium evaporation caused by external heat inputting. The pressure, temperature, displacement, gas concentration and motor power sensors with ultra-low temperature resistant are installed in the device to obtain complete sealing performance data. The device has a strong structural adaptability and can be used to implement experimental study on the labyrinth, brush, honeycomb, lip seal and other types of radial seals. Effects of the seal radial clearance and land configurations on the sealing performance can be studied by replacing the shaft sleeve outside the rotor. Furthermore, the rotor speed can be controlled by the servo motor to accomplish the seal test under multiple conditions.

In order to achieve the above objective, the technical solution adopted by the present invention is:

A dynamic seal test device for cryogenic fluid medium comprises a stator unit, a rotor unit, a slipway 5.2, a servo motor unit and sensors. The stator unit and the rotor unit together form a dynamic seal test structure. The servo motor unit provides power for the rotor unit, and sensors are used to detect the sealing performance.

The stator unit comprises vacuum flexible pipe 1.1, nut 1.2, metal stator 1.3, thermal insulation sleeve 1.4, gland 1.6, countersunk head screw I 1.7, countersunk head screw II 1.8, static seal ring 1.9, dynamic seal ring 1.10 and measurement chamber 1.11. The metal stator 1.3 is a cylindrical structure with variable diameters, and its small diameter section serves as medium inlet pipe 1.*a*. Displacement sensor mounting hole I 1.*c* is processed on the end face of the metal stator 1.3, and a sensor mounting hole is processed on the circumferential surface of the metal stator 1.3. The vacuum flexible pipe 1.1 is connected with the medium inlet pipe 1.*a* of the metal stator 1.3 through the nut 1.2. The thermal insulation sleeve 1.4 is a cylindrical structure, one side is closed and has the medium inlet at the center. Displacement sensor mounting hole II 1.*d* is processed on the closed side of the thermal insulation sleeve 1.4. The thermal insulation sleeve 1.4 is assembled into the metal stator 1.3 by interference fit. The axis of the displacement sensor mounting hole I 1.*c* coincides with that of the displacement sensor mounting hole II 1.*d*. The medium inlet of the thermal insulation sleeve 1.4 is connected with the medium inlet pipe 1.*a*. The seal 1.5 is assembled into the metal stator 1.3 by interference fit. The thermal insulation sleeve 1.4 and the seal 1.5 are assembled in parallel. The axes of the metal stator 1.3, the thermal insulation sleeve 1.4 and the seal 1.5 coincide. The gland 1.6 is installed on the open end of the metal stator 1.3 through the countersunk head screw I 1.7 and countersunk head screw II 1.8 to press out the thermal insulation sleeve 1.4 and the seal 1.5. A through-hole is machined on the gland 1.6. The measurement chamber 1.11 is a hollow thin-walled cylindrical structure, and two through-holes with different diameters are respectively processed on two end faces, corresponding to the outside diameters of the large-diameter end of the metal stator 1.3 and vacuum rotor 2.1. The static seal ring 1.9 is adhered to the metal stator 1.3 for ensuring the static sealing. The dynamic seal ring 1.10 is assembled on the through-hole corresponding to the position of the vacuum rotor 2.1 to ensure the dynamic sealing. The measurement chamber 1.11 is fixed on the outside of the metal stator 1.3 by pressing out the static seal ring 1.9.

The slipway 5.2 is installed on base 5.1 through four bolts I 5.5. The slipway 5.2 comprises slide 5.3 and the threaded rod. The slide 5.3 moves directionally under the action of the threaded rod. The stator unit is installed on the slide 5.3 through the support 1.12, and the support 1.12 is fixed on the slide 5.3 by four bolts II 5.6. The stator unit moves directionally with the slide 5.3.

The rotor unit comprises vacuum rotor 2.1, shaft sleeve 2.2, screw I 2.3, screw II 2.4, fore bearing 2.5, rear bearing 2.6 and coupling 2.8. The vacuum rotor 2.1 is of a hollow cylindrical structure with variable outside diameters, and rotor inner channel 2.$a$ is processed inside the vacuum rotor 2.1 along the axis for liquid medium flowing. The annular vacuum cavity 2.$b$ is processed inside the vacuum rotor 2.1 to create a thermal insulation condition, and the vacuum cavity 2.$b$ is coaxial with the vacuum rotor 2.1. Rotor external hole 2.7 which is interlinked with the rotor inner channel 2.$a$ is processed in the middle of the vacuum rotor 2.1 to discharge the liquid medium. The shaft sleeve 2.2 is of a thin-walled structure with one side closed, and a through-hole is processed on the closed side which is interlinked with the rotor inner channel 2.$a$ for medium flowing. The shaft sleeve 2.2 is mounted on the outside the small diameter section of the vacuum rotor 2.1. The shaft sleeve 2.2 and the vacuum rotor 2.1 are interference fit, and their ends are fixed together with the screw I 2.3 and the screw II 2.4. The fore bearing 2.5 and the rear bearing 2.6 are installed at the ⅓ and ⅔ of the total length of the vacuum rotor 2.1, respectively. The fore bearing 2.5 is assembled inside fore bearing seat 5.7 and the rear bearing 2.6 is assembled inside rear bearing seat 5.8. The fore bearing seat 5.7 and the rear bearing seat 5.8 are installed on the base 5.1 by two bolts III 5.9 and two bolts IV 5.10, respectively. The fore bearing 2.5 is coaxial with the rear bearing 2.6. The vacuum rotor 2.1 is coaxial with the metal stator 1.3.

The stator unit is driven by the slipway 5.2 to make the shaft sleeve 2.2 traverse the measurement cavity 1.11 and the gland 1.6 into the metal stator 1.3, so that the stator unit is sheathed on the outside the rotor unit. The medium flowing channel is composed of the stator inner channel 1.$b$ of the medium inlet pipe 1.$a$, the medium inlet of the thermal insulation sleeve 1.4, the through-hole of the shaft sleeve 2.2 and the rotor inner channel 2.$a$. The gap between the measurement chamber 1.11 and the rotor unit is sealed by the dynamic seal ring 1.10.

The servo motor unit comprises motor 3.1, servo driver 3.2 and cable 3.3. The motor 3.1 and the vacuum rotor 2.1 are directly linked through the coupling 2.8, and they are coaxial. The motor 3.1 and the servo driver 3.2 are linked through the cable 3.3 to transmit the signal and control the motor. The motor 3.1 is installed on motor support 5.13 through four bolts VII 5.15. The motor support 5.13 is installed on motor base 5.11 through four bolts VI 5.14. The motor base 5.11 is installed on the base 5.1 through four bolts V 5.12.

Sensors comprises displacement sensor 4.1, temperature sensor I 4.2, temperature sensor II 4.3, temperature sensor III 4.4, temperature sensor IV 4.5, temperature sensor V 4.6, temperature sensor VI 4.7, temperature sensor VII 4.8, temperature sensor VIII 4.9, temperature sensor IX 4.10, temperature sensor X 4.11, temperature sensor XI 4.12, and temperature sensor XII 4.13, pressure sensor I 4.14, pressure sensor II 4.15, pressure sensor III 4.16, pressure sensor IV 4.17, pressure sensor V 4.18, pressure sensor VI 4.19, pressure sensor VII 4.20, gas concentration sensor 4.21 and power sensor 4.22, they are all of low temperature resistance. The displacement sensor 4.1, which is used to measure the axial deformation of the vacuum rotor 2.1 under ultra-low temperature, is installed inside the displacement sensor mounting hole I 1.$c$ and the displacement sensor mounting hole II 1.$d$. The gap between the displacement sensor 4.1 and the displacement sensor mounting hole I 1.$c$ and the displacement sensor mounting hole II 1.$d$ is sealed using the binder to prevent the leakage of cryogenic fluid medium. The temperature sensor I 4.2 is installed on the outside of the metal stator 1.3 at the installation point I 4.$a$ to measure the temperature on the outside surface of the metal stator 1.3. The temperature sensor II 4.3 is installed on the outside of the metal stator 1.3 at the installation point II 4.$b$ to measure the temperature on the inner surface of the metal stator 1.3. The mounting hole of the temperature sensor II 4.3 is a blind hole, and the distance between the bottom of the blind hole and the inner surface of the metal stator 1.3 is 0.5 mm. The temperature sensor III 4.4 is installed on the outside of the metal stator 1.3 at the installation point III 4.$c$ and inserted into the thermal insulation sleeve 1.4 to measure the temperature on the outside surface of the thermal insulation sleeve 1.4. The mounting hole of the temperature sensor III 4.4 is a blind hole and the distance between the bottom of the blind hole and the outside surface of the thermal insulation sleeve 1.4 is 0.5 mm. The temperature sensor IV 4.5 is installed on the outside of the metal stator 1.3 at the installation point IV 4.$d$ and inserted into the thermal insulation sleeve 1.4 to measure the temperature on the inner surface of the thermal insulation sleeve 1.4. The mounting hole of the temperature sensor IV 4.5 is a blind hole, and the distance between the bottom of the blind hole and the inner surface of the thermal insulation sleeve 1.4 is 0.5 mm. The temperature sensor V 4.6 is installed on the outside of the metal stator 1.3 at the installation point V 4.$e$ and to penetrate the thermal insulation sleeve 1.4 to measure the temperature of the cryogenic fluid medium before sealing process. In the sensor mounting area of the metal stator 1.3, the temperature sensor VI 4.7, the temperature sensor VII 4.8, the temperature sensor VIII 4.9, the temperature sensor IX 4.10, the temperature sensor X 4.11, the temperature sensor XI 4.12 and the temperature sensor XII 4.13 are installed on the outside surface of the seal 1.5 and to penetrate the seal 1.5 at the installation point VI 4.$f$, the installation point VII 4.$g$, the installation point VIII 4.$h$, the installation point IX 4.$i$, the installation point X 4.$j$, the installation point XI 4.$k$ and the installation point XII 4.$l$, respectively. These temperature sensors are used to measure the temperature of the cryogenic fluid medium at different positions. In the sensor mounting area of the metal stator 1.3, the pressure sensor I 4.14, the pressure sensor II 4.15, the pressure sensor III 4.16, the pressure sensor IV 4.17, the pressure sensor V 4.18, the pressure sensor VI 4.19 and the pressure sensor VII 4.20 are installed on the outside of the seal 1.5 and to penetrate the seal 1.5 at the installation point XIII 4.$m$, the installation point XIV 4.$n$, the installation point XV 4.$o$, the installation point XVI 4.$p$, the installation point XVII 4.$q$, the installation point XVIII 4.$r$ and the installation point XIX 4.$s$, respectively. These pressure sensors are used to measure the pressure of the cryogenic fluid medium at different positions. The gaps between the installation points and the whole temperature and pressure sensors are sealed with binder to prevent the leakage. The gas concentration sensor 4.21 is installed on the end face of the measurement chamber 1.11. The measuring head of the gas concentration sensor 4.21 traverses the measurement chamber 1.11 and is located inside the measurement chamber 1.11 to measure the leakage of the cryogenic medium in real time. The power sensor 4.22 is installed on the servo driver 3.2 to measure the load power of the motor 3.1.

In the cryogenic fluid dynamic seal test process, the cryogenic fluid medium enters the medium inlet pipe 1.a from the vacuum flexible pipe 1.1, and the fluid is ejected from the rotor external hole 2.7 through the stator inner channel 1.b and the rotor inner channel 2.a. A small amount of the fluid enters the leakage cavity 1.e through the gap between the surface of the thermal insulation sleeve 1.4 and the shaft sleeve 2.2, and then leaks into the measurement chamber 1.11 after passing through the seal 1.5. The sealing performance of seal 1.5 is finally judged through the gas concentration in the measurement chamber 1.11 measured by the gas concentration sensor 4.21.

The advantages of the invention conclude that the structures of the vacuum rotor and the low thermal conductivity stator are employed to greatly improve the thermal insulation capacity of the test device, which avoids the evaporation of the cryogenic fluid medium induced by the heat transfer from external environment. A full range of sensors characterizing the sealing status in the test device ensures the comprehensiveness of seal performance parameter measurement. The seals and shaft sleeves can be flexibly replaced, which is beneficial to study different seal structures without modifying the test device. The structure design of the metal stator with local hollowing out on its circumferential surface is beneficial to adjust the installation position of sensors induced by the replacement of seals. Considering the feature of easy gasification for the cryogenic liquid medium under the room temperature and atmospheric pressure, the gas concentration sensor is used to measure the leakage rate with advantages of simple principle and high measurement accuracy. The servo motor is used to control the rotor speed, realizing the sealing performance test under multiple working conditions.

Figure 1:
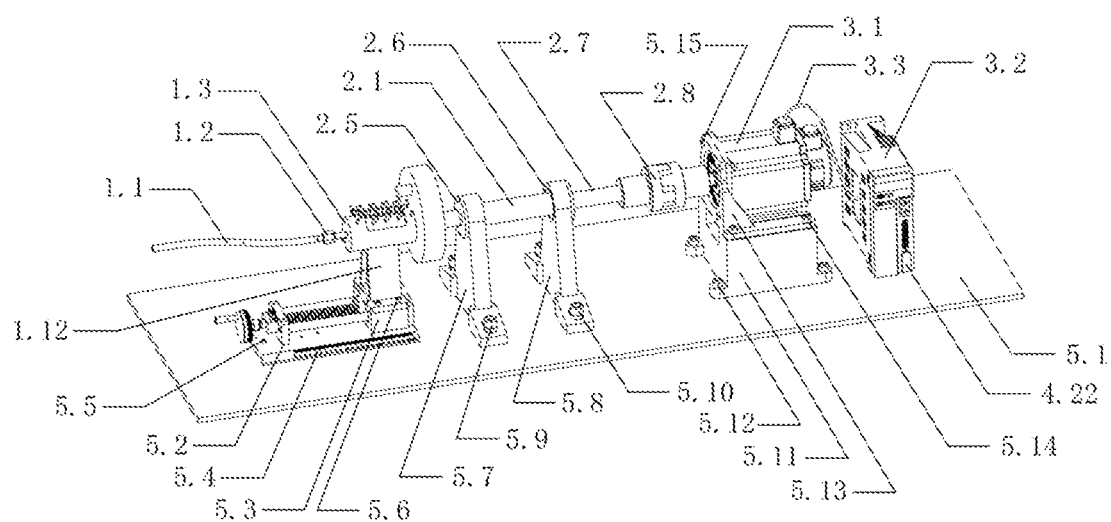
FIG. 1 is the schematic diagram of the dynamic seal test device for cryogenic fluid medium.

In Figure: 1.1—vacuum flexible pipe; 1.2—nut; 1.3—metal stator; 1.4—thermal insulation sleeve; 1.5—seal; 1.6—gland; 1.7—countersunk head screw I; 1.8—countersunk head screw II; 1.9—static seal ring; 1.10—dynamic seal ring; 1.11—measurement chamber; 1.12—support; 1.a—medium inlet pipe; 1.b—stator inner channel; 1.c—displacement sensor mounting hole I; 1.d—displacement sensor mounting hole II; 1.e—leakage cavity; 2.1—vacuum rotor; 2.2—shaft sleeve; 2.3—screw I; 2.4—screw II; 2.5—fore bearing; 2.6—rear bearing; 2.7—rotor external hole; 2.8—coupling; 2.a—rotor inner channel; 2.b—annular vacuum cavity; 3.1—motor; 3.2—servo driver; 3.3—cable; 4.1—displacement sensor; 4.2—temperature sensor I; 4.3—temperature sensor II; 4.4—temperature sensor III; 4.5—temperature sensor IV; 4.6—temperature sensor V; 4.7—temperature sensor VI; 4.8—temperature sensor VII; 4.9—temperature sensor VIII; 4.10—temperature sensor IX; 4.11—temperature sensor X; 4.12—temperature sensor XI; 4.13—temperature sensor XII; 4.14—pressure sensor I; 4.15—pressure sensor II; 4.16—pressure sensor III; 4.17—pressure sensor IV; 4.18—pressure sensor V; 4.19—pressure sensor VI; 4.20—pressure sensor VII; 4.21—gas concentration sensor; 4.22—power sensor; 4.a—installation point I; 4.b—installation point II; 4.c—installation point III; 4.d—installation point IV; 4.e—installation point V; 4.f—installation point VI; 4.g—installation point VII; 4.h—installation point VIII; 4.i—installation point IX; 4.j—installation point X; 4.k—installation point XI; 4.l—installation point XII; 4.m—installation point XIII; 4.n—installation point XIV; 4.o—installation point XV; 4.p—installation point XVI; 4.q—installation point XVII; 4.r—installation point XVIII; 4.s—installation point XIX; 5.1—base; 5.2—slipway; 5.3—slide; 5.4—scale; 5.5—four bolts I; 5.6—four bolts II; 5.7—fore bearing seat; 5.8—rear bearing seat; 5.9—bolts III; 5.10—bolts IV; 5.11—motor base; 5.12—bolts V; 5.13—motor support; 5.14—bolts VI; 5.15—bolts VII.

DETAILED DESCRIPTION

The specific embodiments of the present invention will be described in detail below with reference to the drawings and technical solutions:

In the embodiment, the cryogenic fluid medium is the liquid nitrogen, its temperature is lower than $-180°$ C. and its supply pressure is 0.5 MPa. The material of the metal stator 1.3 is 316L stainless steel, and the height and width of mounting area for sensor installation are 66 mm and $\frac{1}{3}$ circumference. The material of shaft sleeve 2.2 is cemented carbide, its outer diameter is 30 mm, the hardness is 55 HRC, and the roughness after fine grinding is Ra 0.5. Supporting units such as the base 5.1 are all 45 steel. The material of the measurement chamber 1.11 is acrylic. The material of the static seal ring 1.9 and the dynamic seal ring 1.10 is fluororubber, and its working temperature range is $-20$-$280°$ C. The fore bearing 2.5 and the rear bearing 2.6 are NSK angular contact ball bearings with an inner diameter of 35 mm. The thermal conductivity of the annular vacuum cavity 2.b is 0. The material of thermal insulation sleeve 1.4 is polyimide, its thermal conductivity is 0.29 W/(m·K), and the linear expansion coefficient is $2 \times 10^{-5}/°$ C. The seal 1.5 tested in the embodiment is a labyrinth seal, and its material is polyimide. Its structure parameters include inner diameter of 30.2 mm, outer diameter of 55 mm, tooth number of 6, tooth height of 5 mm, tooth pitch of 5.8 mm, tooth tip width of 0.8 mm, anteversion angle of $80°$ and caster angle of $60°$. The displacement sensor 4.1 has a measurement range of 0.5-1.5 mm, its resolution is 0.001 mm, overall dimension is $\Phi 6 \times 10$ mm. The measuring range of all temperature sensors ranges from $-220°$ C. to $100°$ C. The measuring range of all pressure sensors ranges from 0.1-1.6 MPa, and their accuracy is 0.5% FS. The hole diameter for measuring temperature and pressure is 1 mm. The nitrogen concentration sensor is used as the gas concentration sensor 4.21 in the embodiment, its resolution is 0.01% vol. The power sensor 4.22 has an accuracy of 0.2% FS. The above sensors can all normally work under the temperature of $-200°$ C., and their output signal is 4-20 mA. The maximum speed of the motor 3.1 is 12000 rpm. The servo driver 3.2 can realize motor start and stop, forward and reverse control and stepless speed regulation. The maximum moving distance of slipway 5.2 is 274 mm and its minimum resolution is 0.01 mm. The range of scale 5.4 is 300 mm, and its resolution is 0.5 mm.

Figure 2:
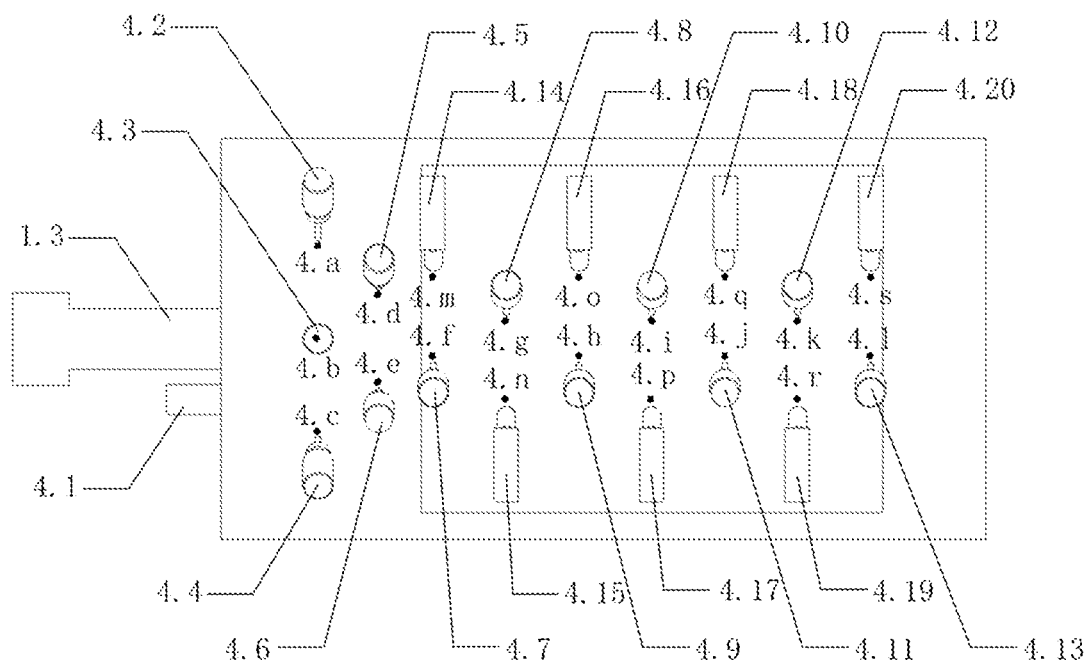
FIG. 2 is the schematic diagram of the sensor layout in the stator and seal.
Figure 3:
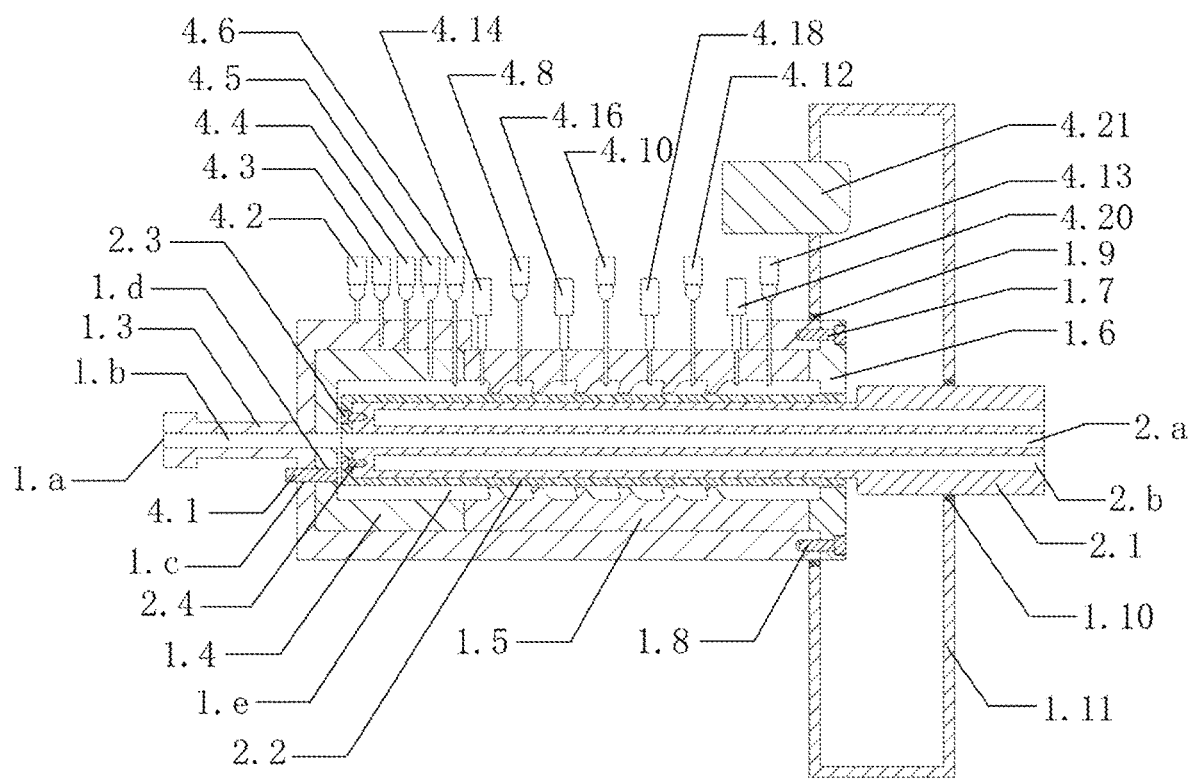
FIG. 3 is the schematic diagram of the seal test structure.

The assembly process of the dynamic seal test device for cryogenic fluid medium is as follows. As shown in FIGS. 1, 2 and 3, Step one, temperature and pressure measuring holes are processed according to the design, and then the thermal insulation sleeve 1.4 and the seal 1.5 are orderly assembled into the metal stator 1.3 through the interference fit. The thermal insulation sleeve 1.4 and the seal 1.5 are pressed out using the gland 1.6. The gland 1.6 and the metal stator 1.3 are fastened together using the countersunk head screw I 1.7 and the countersunk head screw II 1.8. The metal stator 1.3 is fixed on the slipway 5.2 through four bolts II 5.6. The static seal ring 1.9 and the dynamic seal ring 1.10 are adhered to the inner hole grooves on both sides of the measurement chamber 1.11. The static seal ring 1.9 is fixed on the circumferential surface of the right end of the metal stator 1.3 through the interference fit, which is 15 mm away from the right end face, and no relative rotation.

Step two, the fore bearing seat 5.7, the rear bearing seat 5.8, the motor seat 5.11 and the servo driver 3.2 are installed on the base 5.1 in turn. The motor 3.1 is linked with the servo driver 3.2 through the cable 3.3. The shaft sleeve 2.2 is installed on the left end of the vacuum rotor 2.1 with a small interference, and the contact surface is fastened by the screw I 2.3 and screw II 2.4.

Step three, the vacuum rotor 2.1 is placed within the inner hole of the fore bearing seat 5.7 and the rear bearing seat 5.8. The fore bearing 2.5 and the rear bearing 2.6 are assembled inside the corresponding fitting surfaces between the vacuum rotor 2.1 and the fore bearing seat 5.7, the rear bearing seat 5.8. The coaxiality between the bearings and the stator is required to reach 5 μm. The motor support 5.13 is installed on the motor base 5.11, and the motor 3.1 is installed on the motor support 5.13. The motor 3.1 and the vacuum rotor 2.1 are linked by the coupling 2.8, and their coaxiality is 5 μm.

Step four, the displacement sensor 4.1 is installed in the displacement sensor mounting hole I 1.c and the displacement sensor mounting hole II 1.d, also, the sensor measuring surface is flush with the inner end face of the thermal insulation sleeve 1.4. The temperature sensors 4.2-4.13 are orderly installed into the temperature measuring holes of the metal stator 1.3, the thermal insulation sleeve 1.4 and the seal 1.5. The pressure sensors 4.14-4.20 are orderly installed into the pressure measuring holes on the seal 1.5. The gas concentration sensor 4.21 is installed on the measurement chamber 1.11, and the measuring surface is inside the measurement chamber 1.11. All the gaps are sealed with adhesive. The power sensor 4.22 is installed on the servo driver 3.2.

In the cryogenic fluid dynamic seal test process, the vacuum flexible pipe 1.1 is firstly linked with the medium inlet pipe 1.a of the metal stator 1.3 through the nut 1.2. Then the slipway 5.2 is rolled to let the left end of the vacuum rotor 2.1 insert into the inner hole of the metal stator 1.3. The moving distance is read by the scale 5.4 on the slipway 5.2. The slipway 5.2 is locked while the axial end gap between the shaft sleeve 2.2 and the thermal insulation sleeve 1.4 reaches 1 mm. Meanwhile, there is a slight interference between the dynamic seal ring 1.10 and the outside surface of the vacuum rotor 2.1 to achieve an easy relative rotation. Next, the rotational speed is set by the servo driver 3.2 and the motor 3.1 is started. The cryogenic fluid medium enters the medium inlet pipe 1.a from the vacuum flexible pipe 1.1, and then the fluid is ejected from the rotor external hole 2.7 after passing through the stator inner channel 1.b and the rotor inner channel 2.a. However, a small amount of the fluid flows through the end gap between the thermal insulation sleeve 1.4 and the shaft sleeve 2.2 and then enters into the leakage cavity 1.e. Finally, the leakage flows into the measurement chamber 1.11 through the seal 1.5. At this time, the axial cryogenic deformation of the rotor, the temperature field of the stator and the liquid nitrogen, the pressure field of the liquid nitrogen, the leakage rate of liquid nitrogen and load power of the motor are obtained by the displacement sensor 4.1, the temperature sensors 4.2-4.13, the pressure sensors 4.14-4.20, the gas concentration sensor 4.21 and the power sensor 4.22, respectively.

The invention simulates the approximate adiabatic environment in the practical engineering, which makes the gasification reason of the cryogenic fluid medium closer to the real situation and eliminates the interference of the mass transfer from evaporation on the mass transfer from cavitation in dynamic sealing research. The thermal insulation design helps to reduce the low temperature deformation, ensuring the stability of the test device. The forms and structure of seals can be easily replaced to achieve the purpose of testing a variety of seals without modifying the test device. A comprehensive, accurate and high-efficiency test of the dynamic sealing performance for the cryogenic fluid medium can be realized by the reasonable selection and arrangement of multiple sensors.

The invention claimed is:

1. A dynamic seal test device for cryogenic fluid medium, wherein the dynamic seal test device for cryogenic fluid medium includes a stator unit, a rotor unit, a slipway, a servo motor unit and sensors; the stator unit and the rotor unit together form a dynamic seal test structure; the servo motor unit provides a power for the rotor unit, and the sensors are used to detect a sealing performance;

the stator unit comprises a vacuum flexible pipe, a nut, a metal stator, a thermal insulation sleeve, a gland, a countersunk head screw I, a countersunk head screw II, a fixed auxiliary ring, a rotary auxiliary ring and a measurement chamber; the metal stator consists of is a plurality of cylindrical structures of different diameters, and one end of the metal stator serves as a cryogenic fluid medium inlet pipe; a displacement sensor mounting hole I is installed on an end face of the metal stator, and a sensor mounting hole is drilled on a circumferential surface of the metal stator; the vacuum flexible pipe is connected with the cryogenic fluid medium inlet pipe of the metal stator through the nut; the thermal insulation sleeve is a cylindrical structure, one side is closed and has a medium inlet at a center; a displacement sensor mounting hole II is drilled at a non-circular center on a closed side of the thermal insulation sleeve; the thermal insulation sleeve is assembled into the metal stator by interference fit; an axis of the displacement sensor mounting hole I coincides with that of the displacement sensor mounting hole II; a medium inlet of the thermal insulation sleeve is connected with the cryogenic fluid medium inlet pipe; a seal is assembled into the metal stator by interference fit; the thermal insulation sleeve and the seal are assembled in turn; axes of the metal stator, the thermal insulation sleeve and the seal coincide; the gland is installed on an open end of the metal stator through the countersunk head screw I and the countersunk head screw II to press out the thermal insulation sleeve and the seal; a through-hole is machined on the gland; the measurement chamber is a hollow cylindrical structure, and two through-holes with different diameters are respectively drilled on two end faces, corresponding to outside diameters of the other end of the metal stator and a vacuum rotor; the fixed auxiliary ring is adhered to the metal stator; the rotary auxiliary ring is assembled on the through-hole corresponding to a position of the vacuum rotor; the measurement chamber is fixed on an outside of the metal stator by pressing out the fixed auxiliary ring (1.9);

the slipway is installed on a base through four bolts I; the slipway comprises a slide and a threaded rod, and the slide moves directionally under action of the threaded rod; the stator unit is installed on the slide through a support, and the support is fixed on the slide by four bolts II; the stator unit moves directionally with the slide;

the rotor unit comprises the vacuum rotor, a shaft sleeve, a screw I, a screw II, a fore bearing, a rear bearing and a coupling; the vacuum rotor consists of a plurality of cylindrical structures of different outside diameters, and a rotor inner channel (2.a) is machined inside the vacuum rotor along an axis for liquid medium flowing; an annular vacuum cavity is machined inside the vacuum rotor, and the annular vacuum cavity is coaxial with the vacuum rotor; a rotor external hole which is interlinked with the rotor inner channel is drilled in a middle of the vacuum rotor to discharge the cryogenic liquid medium; the shaft sleeve is of a structure with one side closed, and a through-hole is drilled on a closed side which is interlinked with the rotor inner channel for medium flowing; the shaft sleeve is mounted on an outside of one end of the vacuum rotor; the shaft sleeve and the vacuum rotor are interference fit, and their ends are fixed together with the screw I and the screw II; the fore bearing and the rear bearing are installed at $\frac{1}{3}$ and $\frac{2}{3}$ of a total length of the vacuum rotor, respectively; the fore bearing is assembled inside a fore bearing seat and the rear bearing is assembled inside a rear bearing seat; the fore bearing seat and the rear bearing seat are installed on the base by two bolts III and two bolts IV, respectively; the fore bearing is coaxial with the rear bearing; the vacuum rotor is coaxial with the metal stator;

the stator unit is driven by the slipway to make the shaft sleeve traverse the measurement chamber and the gland into the metal stator, so that the stator unit is sheathed on an outside of the rotor unit; a medium flowing channel is composed of a stator inner channel of the cryogenic fluid medium inlet pipe, a medium inlet of the thermal insulation sleeve, the through-hole of the shaft sleeve and the rotor inner channel; a gap between the measurement chamber and the rotor unit is sealed by the rotary auxiliary ring;

the servo motor unit comprises a motor, a servo driver and a cable; the motor and the vacuum rotor are directly linked through the coupling, and they are coaxial; the motor and the servo driver are linked through the cable to transmit a signal and control the motor; the motor is installed on a motor support through four bolts VII; the motor support is installed on a motor base through four bolts VI; the motor base is installed on the base through four bolts V;

the sensors comprise temperature sensors and pressure sensors; a temperature sensor I is installed on the outside of the metal stator corresponding to the thermal insulation sleeve to measure a temperature on an outside surface of the metal stator; a temperature sensor II is installed on the outside of the metal stator corresponding to the thermal insulation sleeve to measure a temperature on an inner surface of the metal stator; a mounting hole of the temperature sensor II is a blind hole, and a distance between a bottom of the blind hole and the inner surface of the metal stator is 0.5 mm; a temperature sensor III is installed on the outside of the metal stator corresponding to the thermal insulation sleeve to measure a temperature on an outside surface of the thermal insulation sleeve; a temperature sensor IV is installed on an outside of the metal stator corresponding to the thermal insulation sleeve and inserted into the thermal insulation sleeve to measure a temperature on the inner surface of the thermal insulation sleeve; a temperature sensor V is installed on the outside of the metal stator corresponding to the thermal insulation sleeve and to penetrate the thermal insulation sleeve to measure a temperature of the cryogenic fluid medium; in a sensor mounting area of the metal stator, a temperature sensor VI, a temperature sensor VII, a temperature sensor VIII, a temperature sensor IX, a temperature sensor X, a temperature sensor XI and a temperature sensor XII are installed on an outside surface of the seal and to penetrate the seal; these temperature sensors are used to measure a temperature of the cryogenic fluid medium at different positions; a pressure sensor I, a pressure sensor II, a pressure sensor III, a pressure sensor IV, a pressure sensor V, a pressure sensor VI and a pressure sensor VII are installed on an outside of the seal and to penetrate the seal, these pressure sensors are used to measure a pressure of the cryogenic fluid medium at different positions; gaps between installation points and the sensors are sealed with binder to prevent leakage; a gas concentration sensor is installed on an end face of the measurement chamber; a measuring head of the gas concentration sensor traverses the measurement chamber and is located inside the measurement chamber to measure the leakage of the cryogenic medium in real time; a power sensor is installed on the servo driver to measure a load power of the motor;

the cryogenic fluid medium enters the cryogenic fluid medium inlet pipe from the vacuum flexible pipe, and the cryogenic fluid medium is ejected from the rotor external hole through the stator inner channel and the rotor inner channel; a part of a fluid enters the leakage cavity through a gap between a surface of the thermal insulation sleeve and the shaft sleeve, and then leaks into the measurement chamber after passing through the seal; a sealing performance of the seal is finally judged through a gas concentration in the measurement chamber measured by the gas concentration sensor.

* * * * *